March 1, 1927. 1,618,992
C. PAGET
KETTLE
Filed June 23, 1925
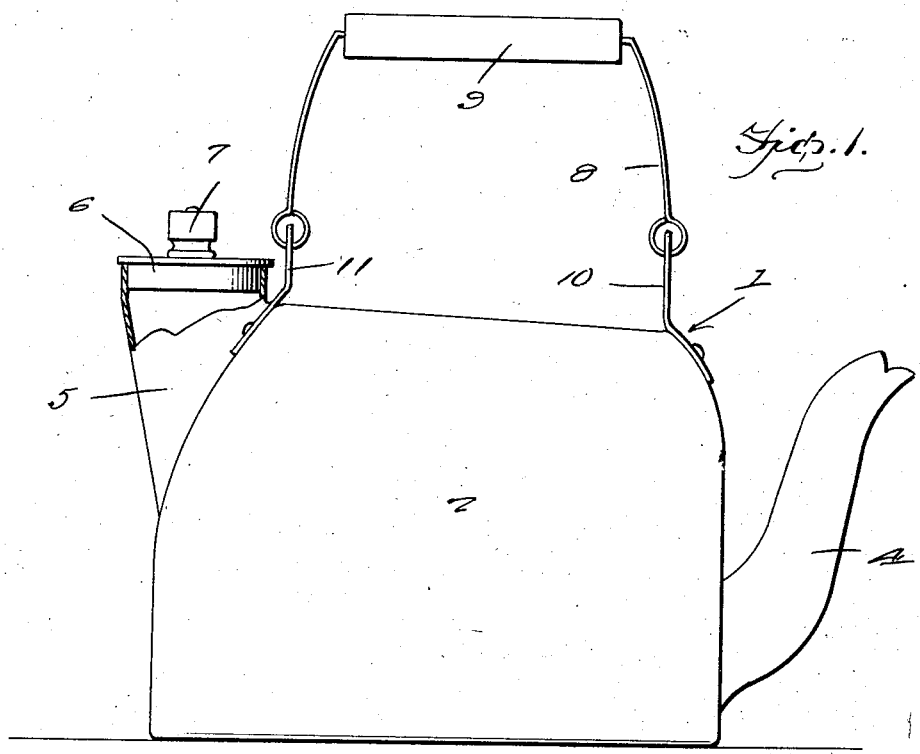
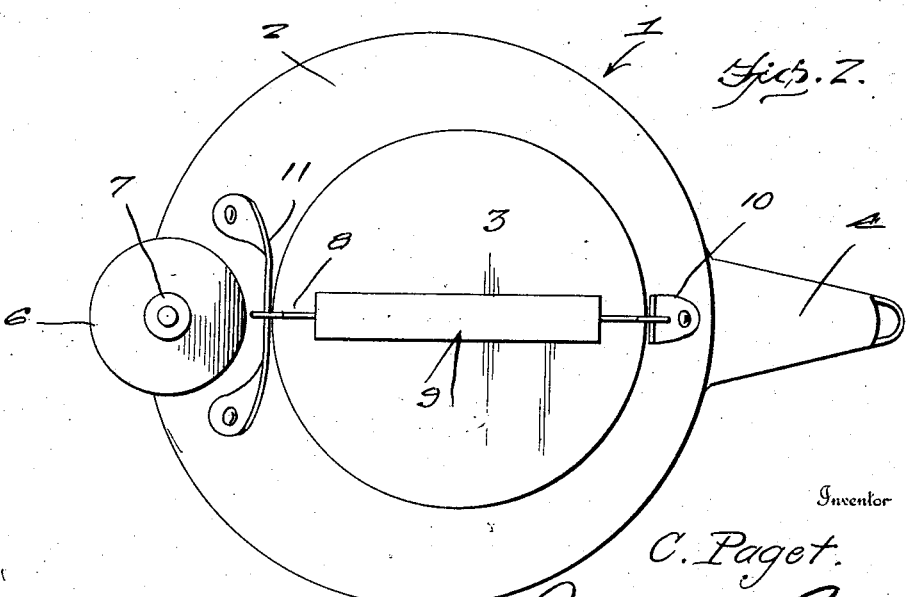
Inventor
C. Paget.
By Clarence A. O'Brien
Attorney Patented Mar. 1, 1927.

1,618,992

UNITED STATES PATENT OFFICE.

CHARLES PAGET, OF SANTA CRUZ, CALIFORNIA.

KETTLE.

Application filed June 23, 1925. Serial No. 39,083.

This invention relates to improvements in tea kettles, and has for its principal object to provide a kettle which is of such construction as to enable the same to be conveniently filled with water without any danger of the person handling the kettle becoming scalded by the steam escaping from the kettle.

A further object of the invention is to provide a tea kettle wherein the steam generated in the kettle will be caused to escape out through the filling neck which is located at a point diametrically opposite the pouring spout and adjacent the rear end of the handle, the filling spout being so arranged as to enable the kettle to be readily and easily refilled.

A further object is to provide a tea kettle of the above mentioned character which is simple in construction, inexpensive, strong and durable and further well adapted to the purpose for which it is designed.

Other objects and advantages of the invention will become apparent during the course of the following description taken in connection with the accompanying drawing.

In the accompanying drawing forming a part of this application and in which like numerals designate like parts throughout the same:

Figure 1 is a side elevation of my improved tea kettle, the filling neck being partly broken away, and Figure 2 is a top plan view of the kettle.

In the drawing, wherein for the purpose of illustration is shown the preferred embodiment of my invention, the numeral 1 designates generally my improved tea kettle, the same comprising the body portion 2, the top of which is closed as illustrated at 3, and the latter slopes gradually toward the side of the body portion, the purpose of which will be hereinafter more fully described. The usual pouring spout 4 is provided at the forward side of the body portion of the kettle.

Extending upwardly from the opposite side of the body portion at a point at diametrically opposite the spout 4 is the tubular filling neck 5, the upper end of which extends above the closed top 3 of the body portion of the kettle in the manner as more clearly illustrated in Figure 1. The removable closure 6 is provided for the upper open end of the filling neck 5 and said closure has associated therewith the knob or handle 7 for grasping the same.

The wire bail which has the wooden grip 9 carried by the intermediate portion thereof is secured at one end to the upstanding ear or lug 10 which is secured on the forward side of the body portion 2 adjacent the top thereof, the other end of the wire bail 8 being secured to the intermediate portion of the upstanding ear or lug 11, the latter being arranged at the rear side of the body portion and forwardly of the upper end of the filling neck 5. The last mentioned upstanding ear or lug 11 is in the form of a strip of metal, the ends of which are secured on the rear side of the body portion on the opposite sides of the filling neck as clearly illustrated in Figure 2.

In using the tea kettle embodying my invention, the steam generated in the body portion of the kettle will escape out through the filling neck 5, due to the forwardly sloping closed top of the body portion and the filling neck is arranged in such a manner so that when the closure 6 is removed, the kettle may be refilled by placing the filling neck directly under a water supply faucet, and there will be no danger of the person handling the kettle being scalded by the escaping steam.

The simplicity in which the present invention is constructed enables the same to be manufactured at a very low cost and will furthermore at all times be positive and efficient in carrying out the purposes for which it is designed.

While I have shown the preferred embodiment of my invention it is to be understood that minor changes in the size, shape and arrangement of parts may be resorted to without departing from the spirit of the invention and the scope of the appended claim.

Having thus described the invention, what I claim as new and desire to secure by Letters Patent is:—

In a tea kettle, the combination of a body having a curved rear side and a closed top, said top sloping gradually downwardly toward the front side of the body, a pouring spout at the front side of the body, a cylindrical filling neck extending upwardly from the rear side of the body, said filling neck including a relatively short front portion, and a relatively long rear portion, the lower edges of the sides of the neck being curved to conform with the curved rear side of the body of the kettle, the upper end of the filling neck extending above the top of said body, a removable closure for the upper end of the filling neck, and a handle for the kettle.

In testimony whereof I affix my signature.

CHARLES PAGET.